Figure 1:
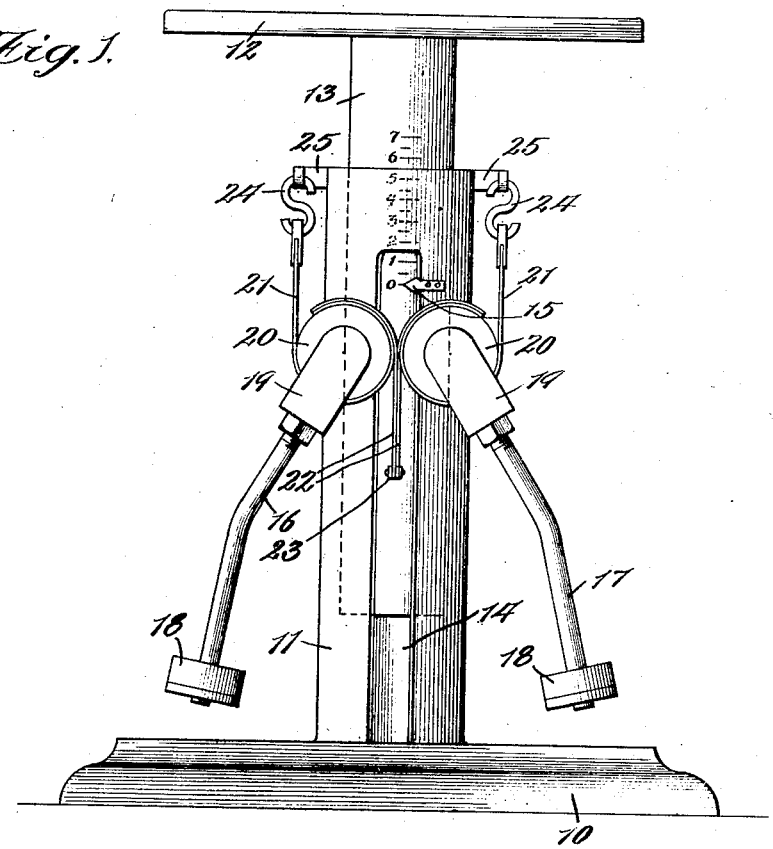

T. C. PROUTY.
WEIGHING SCALE.
APPLICATION FILED FEB. 17, 1909.

1,009,093.

Patented Nov. 21, 1911.

Witnesses:

Inventor:
Theodore C. Prouty,
By Bond, Adams, Pickard & Jackson
Attys

UNITED STATES PATENT OFFICE.

THEODORE C. PROUTY, OF AURORA, ILLINOIS.

WEIGHING-SCALE.

1,009,093.  Specification of Letters Patent. Patented Nov. 21, 1911.

Application filed February 17, 1909. Serial No. 478,467.

*To all whom it may concern:*

Be it known that I, THEODORE C. PROUTY, a citizen of the United States, residing at Aurora, in the county of Kane and State of Illinois, have invented certain new and useful Improvements in Weighing-Scales, of which the following is a specification, reference being had to the accompanying drawings.

This invention relates to weighing scales and has for its object to provide improved means for connecting the weighted arms that act to counterbalance the scale platform or pan and attached parts, the connection being of such a character as to dispense entirely with the necessity for fixed pivots for such arms, thereby avoiding the friction incident to such pivoting and also enabling the scale as a whole to respond with more sensitiveness to the loads imposed upon it. Another advantage attained by the use of my construction when embodied in a scale that rests upon a base as distinguished from one that is suspended from a support, is that it is not necessary to take especial pains to provide that the base be maintained in an absolutely level position, for within reasonable limits my construction will insure perfect operation of the indicating mechanism whether the base of the scale is on an absolute level or not. This is a very important consideration, inasmuch as such scales that rest upon a base ordinarily have to be provided with leveling means in order to insure accuracy in weighing.

I accomplish the results specified by the construction shown in the drawings and hereinafter specifically described.

That which I believe to be new will be pointed out in the claims.

Figure 2:
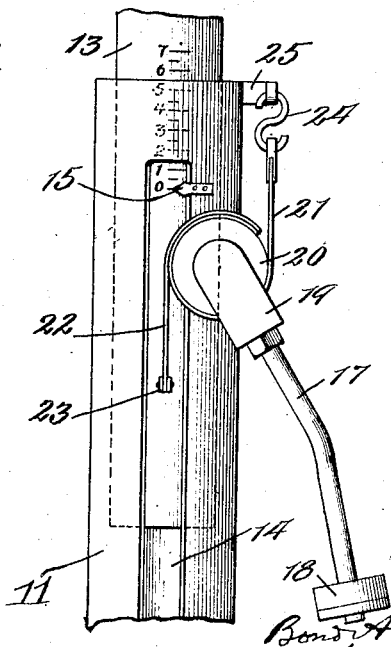

In the drawings:—Figure 1 is a front elevation of a form of scale provided with a base upon which it rests and provided with my improvements. Fig. 2 is a modification showing the application to a scale of the type of that of Fig. 1 of but a single weight-arm.

Referring to Fig. 1, which is an illustration of the form of scale to which the above-mentioned features of improved construction are especially adapted, 10 indicates the base of the scale, from which rises a hollow tubular base standard 11. 12 indicates the platform of the scale upon which the article to be weighed is to be placed, said platform being carried at the upper end of a cylindrical platform standard 13 telescoped into the tubular base standard 11. In the construction shown, the base standard 11 is provided at one side with a longitudinal slot 14, at an appropriate point along one side of which slot is secured a pointer 15 which travels over a suitable graduated reading scale marked upon the platform standard 13. While I have not shown any form of anti-friction devices interposed between the standard members of the scale, it will be understood that the construction in this respect may be of any approved type.

The novel manner of supporting the platform standard in the base standard will now be described. In the construction shown, 16—17 indicate arms or levers, each of which in the construction shown bears a weight 18 at its lower end, which arms are secured at their upper ends in yokes 19, being preferably screw-threaded therein. 20 indicates rollers or drums fixed in the yokes 19, each of which rollers has attached to it a pair of flexible bands 21 and 22, preferably of metal, the bands 22 being secured to the platform standard 13 between two small ears 23 at a point below the position where the rollers are supported, and each band 21 passing on around its roller 20 and extending upward therefrom, being secured to the base standard 14 by means of a hook 24 supported in an ear 25 at a point above its roller 20. The bands 21 and 22 are so attached to the rollers 20 that, when the weighted arms 16—17 extend in a downwardly direction as shown in the figure, a suitable length of the bands will be wound loosely upon each roller between their point of attachment to the roller and the point where the bands diverge from the roller. It will be understood that the platform 12 and standard 13 will, by this means, be yieldingly supported by the weighted arms 16—17, and that downward pressure upon the platform 12, causing a downward pull upon the bands 22, will cause such bands and the bands 21 to unwind from the roller 20, lowering the platform and causing the weights 18 to rise. It will be understood that as the pressure or weight upon the platform 12 is increased, the platform will descend more and more, and the weighted ends of the arms 16—17 will rise higher and higher. The graduated reading scale on the standard 13 will of course be so positioned and proportioned as to show at any point the exact pressure or weight upon the platform, the pointer of course standing at "0" when no pressure is thus applied. By this construction I provide a very delicately balanced and delicately supported weighing scale, doing away entirely with the friction of any pivot or pivots, and in this respect very materially increasing the accuracy of the scale, especially for small weights, making it possible to weigh accurately very light articles on scales adapted to weigh comparatively heavy articles. My improved method of hanging the weighted arm also provides a descending axis of rotation for such arm as the weighted end rises. As a result of this descending axis of rotation of the weighted arm or lever, a greater distance is traversed along the graduated reading scale by the pointer 15 for a certain angular variation of the lever than is the case where a fixed pivot point is employed.

By my construction also, as shown in Fig. 1, in which there are provided two weighted arms to support the platform, I do away with the necessity for carefully leveling the scale and therefore am enabled to dispense with the mechanism ordinarily employed for this purpose. In any construction employing a single weighted supporting or counterbalancing arm or lever, accurate results can be obtained only after the scale has been skilfully leveled, and this process of leveling must be repeated after every change of position of the scale. The reason for this inaccuracy in the use of a single-arm device when not carefully leveled is well understood, the reading scale being positioned and proportioned for the use of the mechanism when leveled and not being positioned or proportioned for use in any other position. I have found that by the use of two oppositely-extending arms as shown, accurate results will be obtained when the scale is tilted slightly from the position for which the reading scale was especially positioned and proportioned. It will be seen, for example, that if the base 10 be raised slightly at one side,—for example at the right in Fig. 1,—the arm 16 would tend to diverge very slightly more from the central longitudinal line of the standard 13 than when in the normal position, thus loosening somewhat its tension on the bands 21 and 22 connected with such arm 16 and thereby decreasing the effectiveness of such arm in supporting the standard 13. At the same time, the arm 17 is brought to a position where it would tend to stand at a wider angle from the perpendicular, thus increasing the effectiveness of this arm 17. It has been found in practice that the increased effectiveness of the arm 17 will offset the increased proportion of the weight upon the standard 13 that bears upon such arm 17 due to the decreased effectiveness of the arm 16, with the result that if the scale be tilted slightly with no load upon the platform the pointer will remain at "0," and that if a load be placed upon the scale in its tipped position it will still accurately weigh such load.

Fig. 2 is a modification of the construction shown in Fig. 1, showing the adaptation of my new and improved method of hanging the counterbalancing levers to a single-lever type of scale. Inasmuch as the parts shown are duplications of corresponding parts shown in Fig. 1, the same reference characters are attached to the parts. This form of construction of course is not provided with any means for doing away with the necessity for leveling the scale but has the other advantages of the construction of Fig. 1, being designed primarily to decrease the friction and to increase the accuracy attainable for weighing light articles.

What I claim as my invention and desire to secure by Letters Patent is:—

1. In a scale, the combination with two telescopic members, a support for articles to be weighed adapted to move with one of said members, a graduated reading scale carried by one of said members, and a pointer carried by the other of said members, of a revoluble member, a flexible band fastened at one end to one of said telescopic members at a point above said revoluble member and at the other end to said revoluble member, a second flexible band fastened at one end to the other of said telescopic members at a point below said revoluble member and at the other end to said revoluble member, and means tending to rotate said revoluble member and to wrap said bands thereon.

2. In a scale, the combination with two telescopic members, a support for articles to be weighed adapted to move with one of said members, a graduated reading scale carried by one of said members, and a pointer carried by the other of said members, of a lever provided with a drum at one end, a flexible band depending from one of said telescopic members and extending under and connected to said drum, and a second flexible band leading downward from the opposite side of said drum and connected at its lower end to the other of said two telescopic members.

3. The combination with two telescopic members, a support for articles to be weighed adapted to move with one of said telescopic members, a graduated reading scale carried by one of said members, and a pointer carried by the other of said members, of a pair of levers connected to both of said telescopic members, the means by which each of said levers is supported and by which it is connected to said telescopic members comprising a drum on the end of said lever, a flexible band depending from one of said telescopic members and extending under and connected to said drum, and a second flexible band leading downward from the opposite side of said drum and connected to the other of said two telescopic members.

THEODORE C. PROUTY.

Witnesses:
ALBERT H. ADAMS,
W. H. DE BUSK.